March 15, 1966 R. B. DOME 3,240,878

STEREOPHONIC COMMUNICATION SYSTEM

Filed Nov. 6, 1961 7 Sheets-Sheet 1

INVENTOR:
ROBERT B. DOME,
BY Joseph Levinson
HIS ATTORNEY.

INVENTOR:
ROBERT B. DOME,

BY Joseph Levinson
HIS ATTORNEY.

INVENTOR:
ROBERT B. DOME,
BY Joseph Levinson
HIS ATTORNEY.

INVENTOR:
ROBERT B. DOME,
BY Joseph Levinson
HIS ATTORNEY.

INVENTOR:
ROBERT B. DOME,
BY Joseph Levinson
HIS ATTORNEY.

INVENTOR:
ROBERT B. DOME,
BY Joseph Levinson
HIS ATTORNEY.

March 15, 1966 R. B. DOME 3,240,878

STEREOPHONIC COMMUNICATION SYSTEM

Filed Nov. 6, 1961 7 Sheets-Sheet 7

INVENTOR:
ROBERT B. DOME,
BY Joseph Levinson
HIS ATTORNEY.

United States Patent Office 3,240,878

Patented Mar. 15, 1966

3,240,878

STEREOPHONIC COMMUNICATION SYSTEM

Robert B. Dome, Geddes Township, Onondaga County, N.Y., assignor to General Electric Company, a corporation of New York Filed Nov. 6, 1961, Ser. No. 150,562
16 Claims. (Cl. 179—15)

Figure 1:
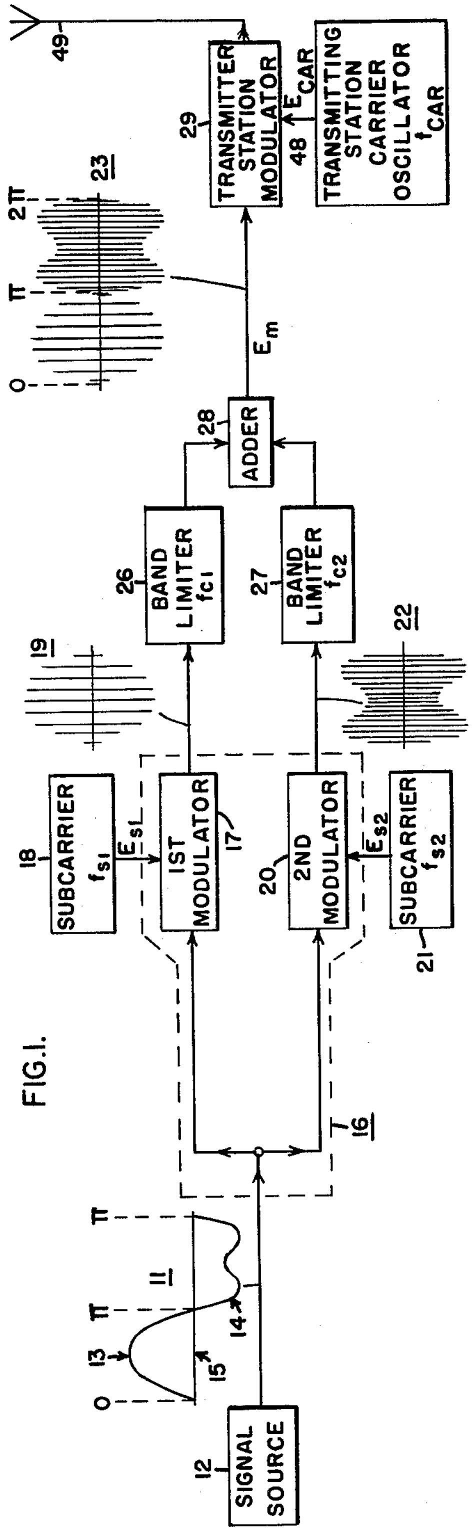

This invention relates to a multiplex system of communication for transmitting stereophonically related signals and more particularly to a multiplex system of communication wherein one of two intelligence signals being transmitted is encoded by frequency division multiplexing.

Present communication systems for transmitting stereophonically related information derive (L) and (R) channel signals from a stereophonic source and combine these channel signals to form distinct (L+R) and (L—R) intelligence signals. Prior to transmission, these intelligence signals are encoded to form a composite modulation signal, hereinafter referred to as $E_m$, which is utilized to modulate a transmitting station carrier signal, $E_{car}$.

In order to maintain the (L+R) and (L—R) signals as distinct intelligence during transmission and to facilitate decoding of the composite modulation signal $E_m$, the (L—R) signal is shifted in frequency. This is generally accomplished by modulating a subcarrier signal $E_s$ with the (L—R) signal in a manner so that the frequency spectrum occupied by the subcarrier signal and its resulting modulation sidebands, referred to as the subchannel, is separate from any portion of the frequency spectrum occupied by the (L+R) signal, referred to as the main channel.

Systems for performing the aforementioned modulation of the subcarrier signal are known wherein the subcarrier signal is either fully transmitted, partially transmitted, or substantially suppressed after modulation by the (L—R) intelligence signal.

Full and partial transmission of a subcarrier signal causes a residual component $E_r$ of the composite modulation signal $E_m$ to exist which continuously modulates the station carrier. In systems wherein $E_{car}$ is amplitude modulated by $E_m$, the continuous modulation of $E_{car}$ by a residual component results in inefficient utilization of station power. When $E_{car}$ is frequency modulated, the residual component undesirably reduces the frequency deviation available for the intelligence signal. When the subcarrier is substantially suppressed, a pilot carrier must be generated and transmitted. In addition to having partially the same effect regarding inefficient utilization of station power and reduction of frequency deviation as discussed with regard to full and partial transmission, means must also be provided at the receiver for reconstituting the subcarrier from the pilot carrier and for providing recombination of the subcarrier with the received sidebands of the intelligence signal.

A multiplex system for transmitting and receiving an electrical signal without generating a residual carrier signal is known in the art. This system provides means for modulating a first and a second carrier signal of differing frequencies with positive and negative alternations, respectively, of the signal being transmitted. The station carrier signals must be substantially separated in frequency in order to prevent interfering harmonic sideband modulation components, which are generated in a channel related to one alternation, from appearing in another channel related to the other alternation. Under the presently regulated allocation of frequency bands within the frequency spectrum to different services, adequate separation of the carrier frequencies may, at times, be infeasible.

Accordingly, it is an object of this invention to provide an improved multiplex system of communication.

It is another object of this invention to provide an improved system of stereophonic communication.

Another object of this invention is to provide a stereophonic communication system for transmitting and receiving the audio portion of a television signal.

Another object of this invention is to provide an improved and efficient system of stereophonic communication utilizing frequency division multiplexing techniques.

Another object of this invention is to provide an improved means for transmitting and receiving the frequency shifted intelligence signal in a stereophonic communication system.

Another object of this invention is to provide a stereophonic system of communication which provides improved utilization of transmitter power in AM systems and full utilization of the allowable frequency deviation by the intelligence signal in FM systems.

It is still another object of this invention to provide a stereophonic system of communication by a multiplexing technique without generating a residual component of a modulation signal.

A further object of this invention is to provide a stereophonic communication system requiring relatively simple and inexpensive means at the receiver for detecting stereophonic signal components.

These and other objects are accomplished in accordance with the present invention in the following manner. A transmitting station is provided including sources of first and second subcarrier signals for encoding a first of two intelligence signals to be transmitted. The first intelligence signal has an average value of voltage with positive and negative alternations about its average value. Multiplexing means are provided for generating an output signal of first subcarrier frequency having an envelope corresponding to the waveform of the positive alternation and an output signal of second subcarrier frequency having an envelope corresponding to the waveform of the negative alternation. The multiplexing means are arranged in a manner so that the output signals of first and second subcarrier frequencies are generated without generating a residual component of subcarrier signal. Means are provided for limiting the bandwidth of the output signals and for forming and transmitting a composite modulation signal to a receiving station. A receiving station is provided including means for simultaneously separating the subcarrier signals from the composite modulation signals and for attenuating, prior to subcarrier detection, overshoot lobes in the received signal, which were introduced at the transmitter as the result of band limiting. Means are also provided for detecting the alternations of the first intelligence signal and for reconstructing the intelligence signal.

Figure 2:
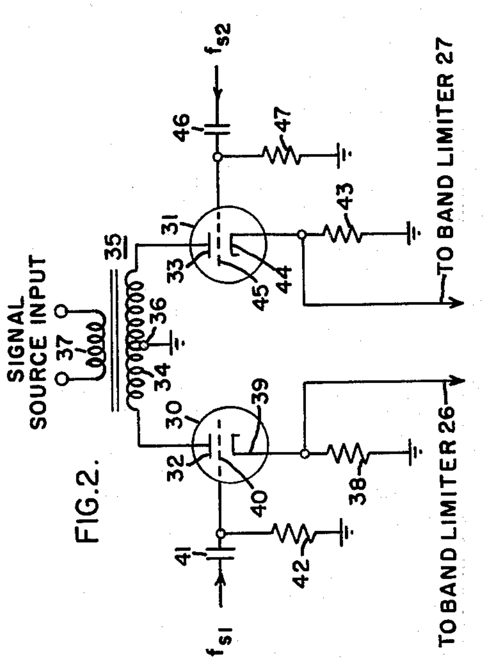
Figure 3:
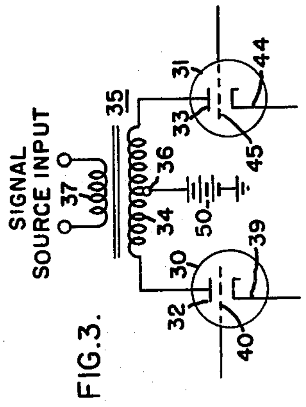
Figure 5:
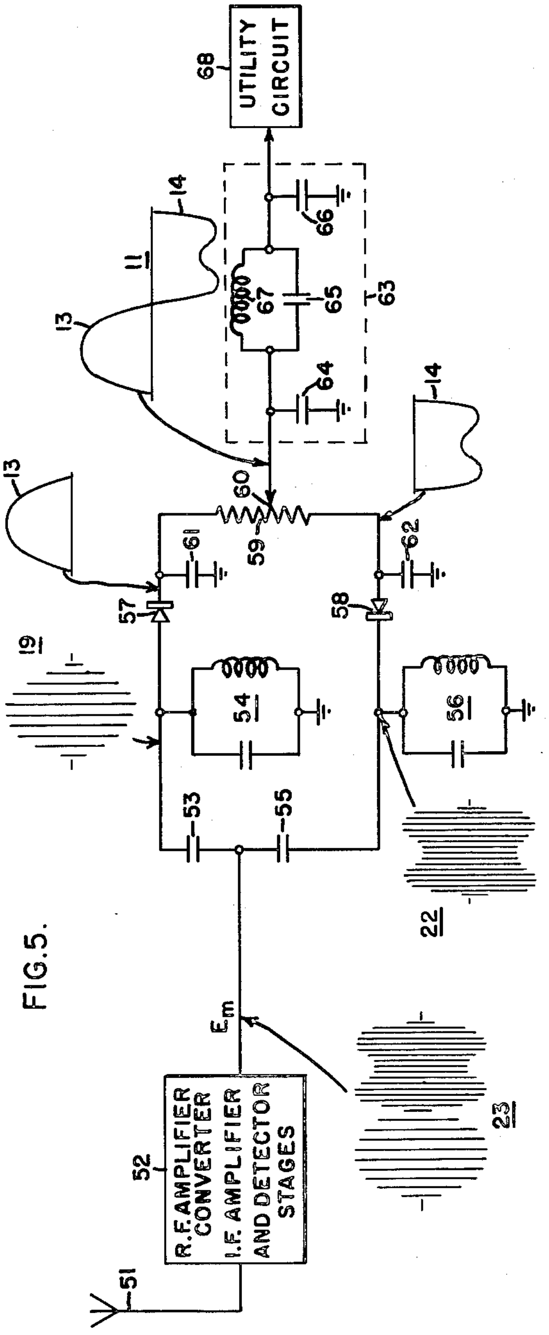
Figure 6:
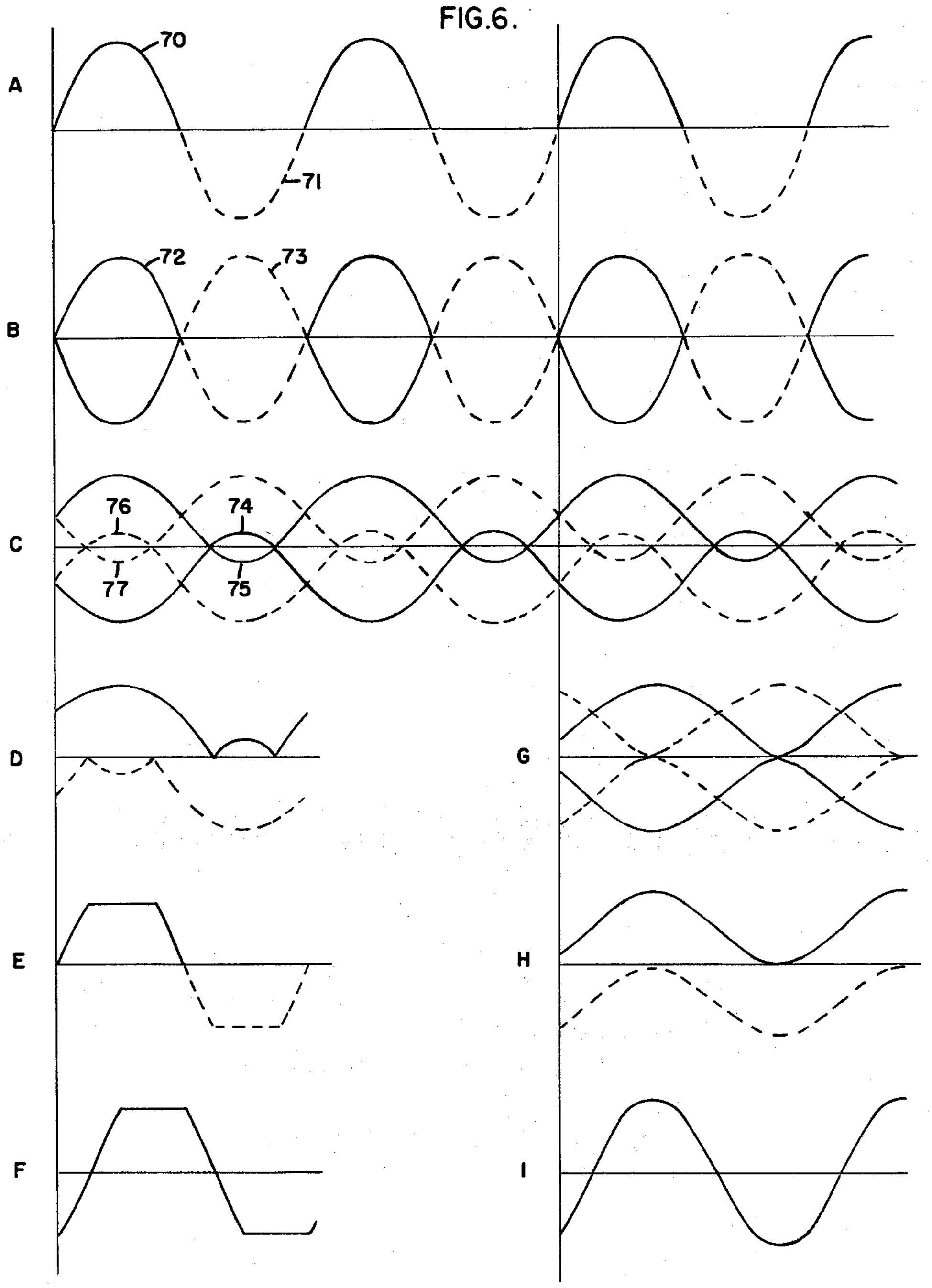
Figure 7:
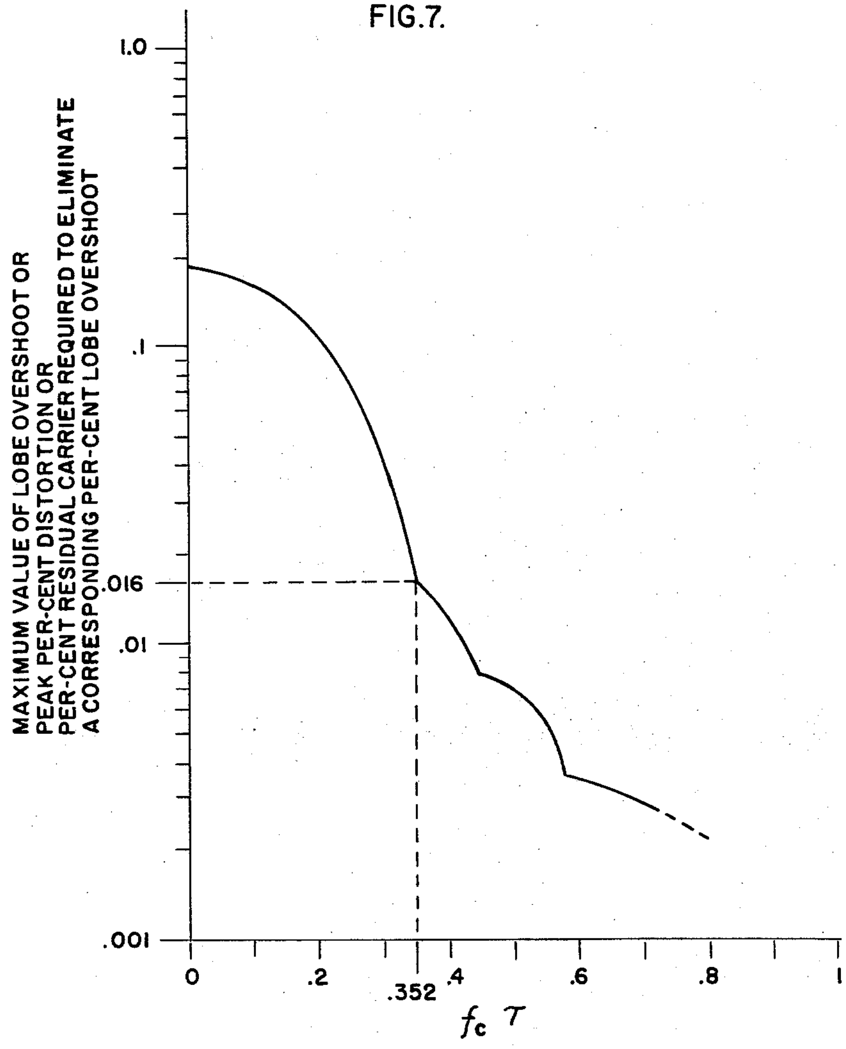
Figure 8:
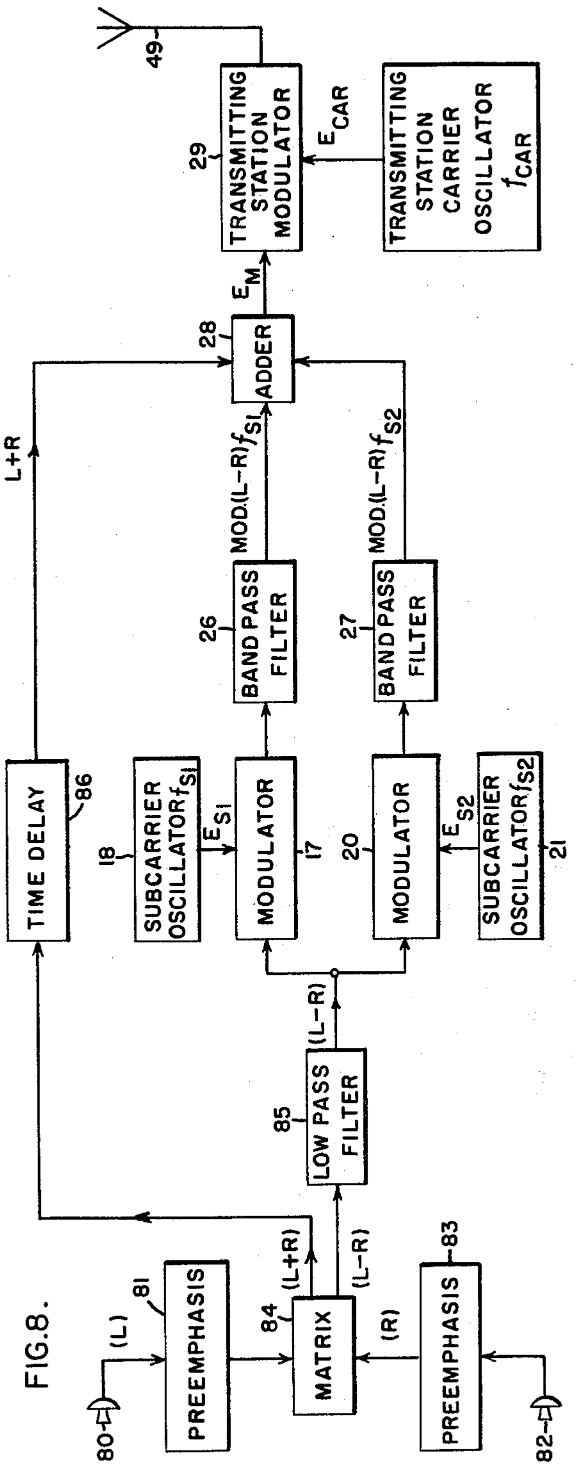
Figure 9:
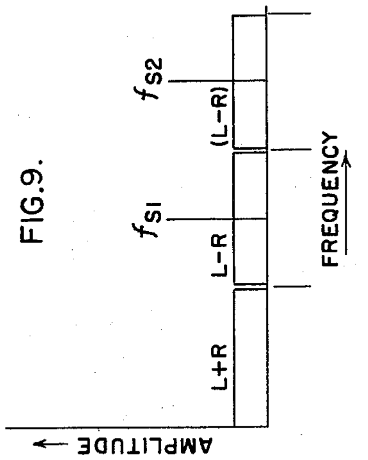
Figure 12:
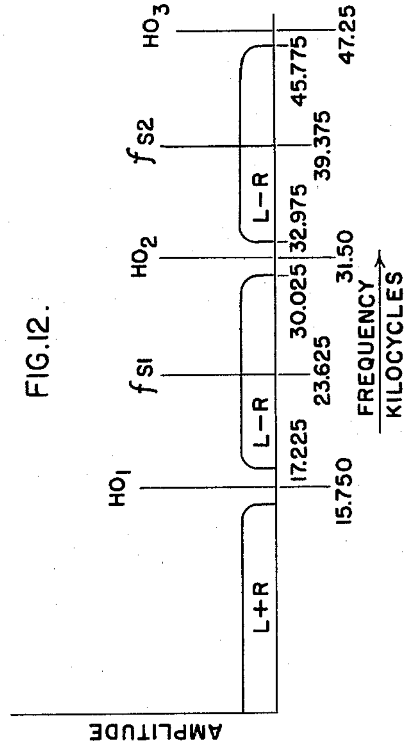
Figure 10:
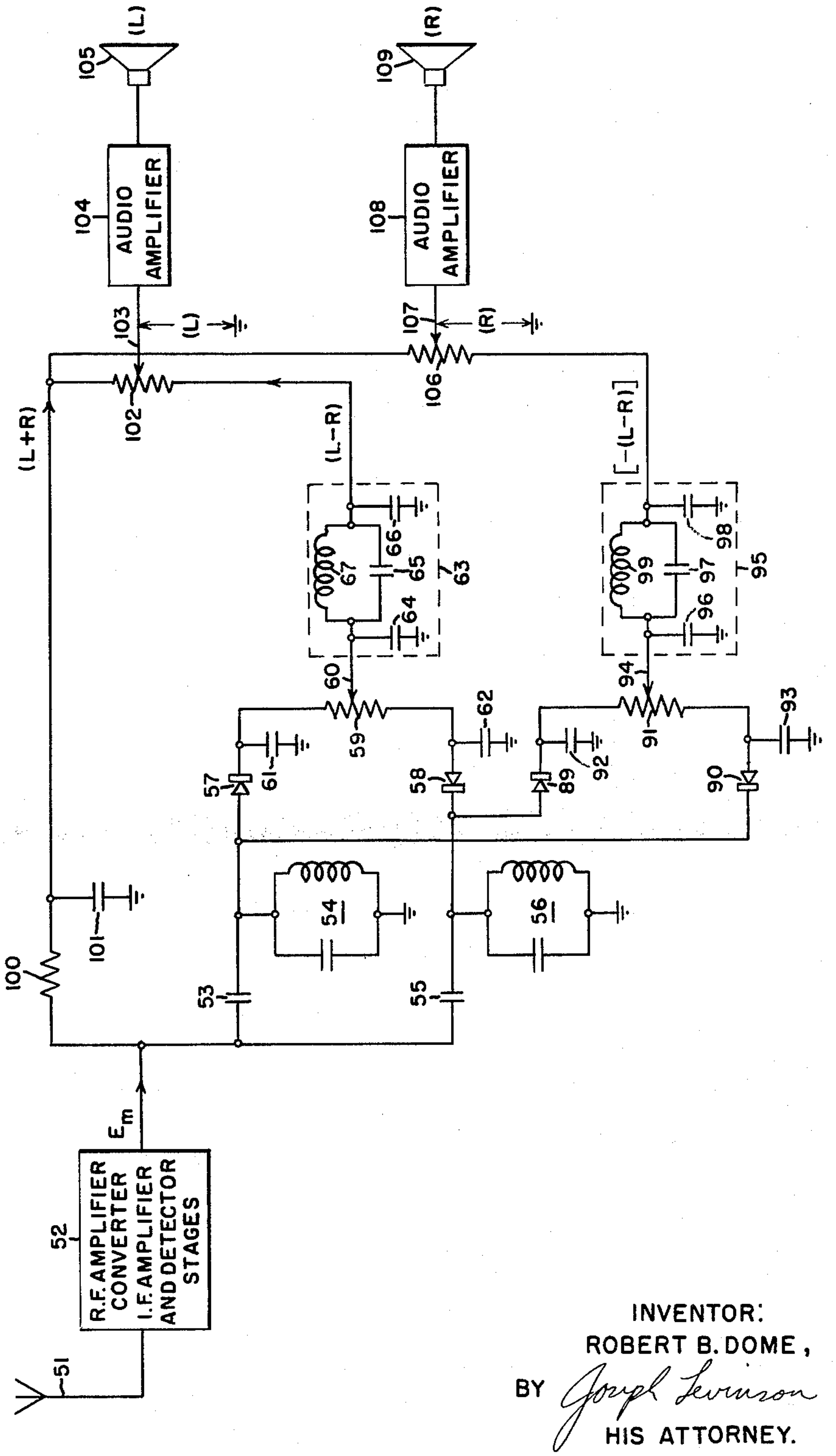
Figure 11:
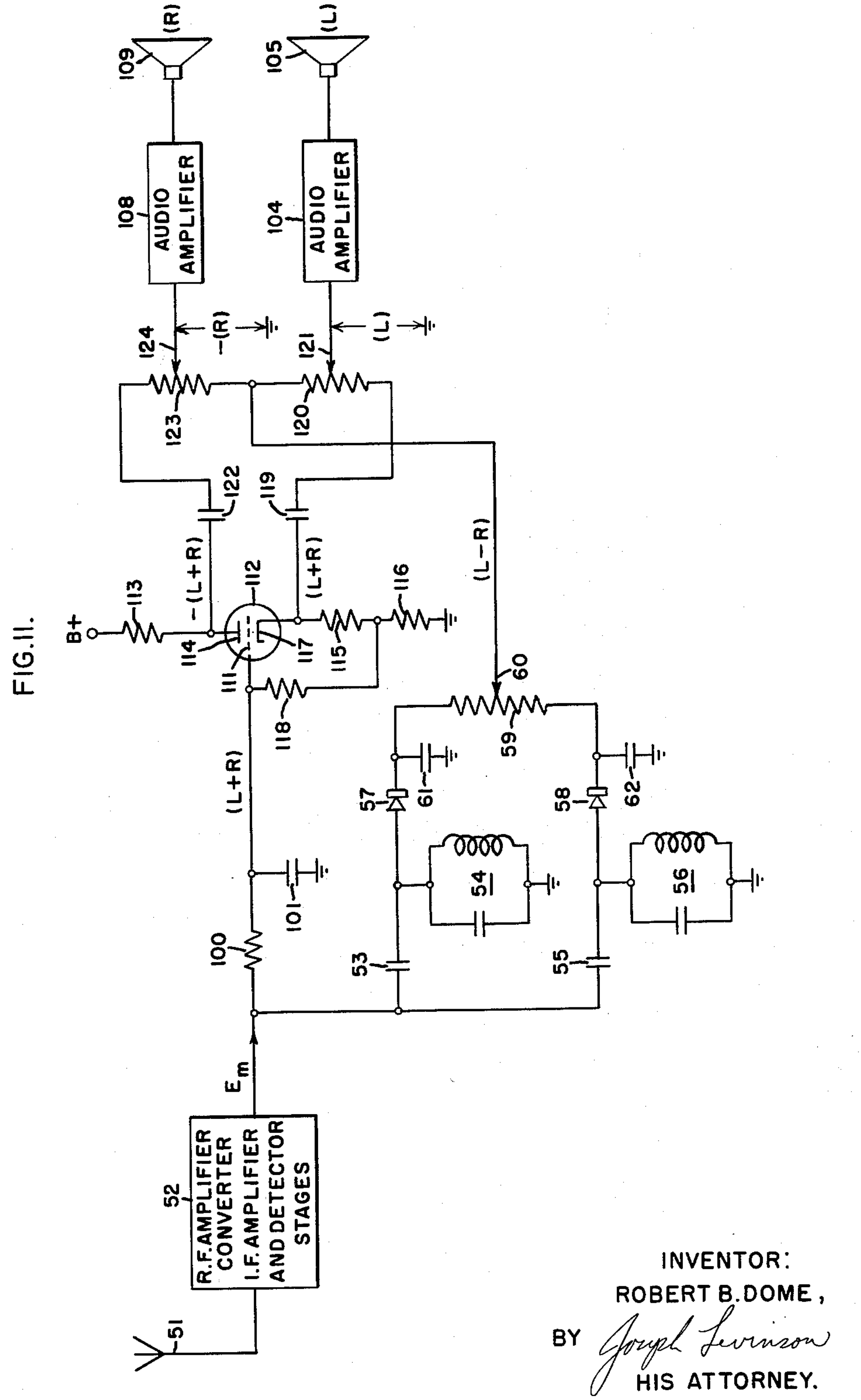

Further objects, features and attending advantages of this invention will be apparent with reference to the following specification and drawings in which:

FIGURE 1 is a block diagram of a multiplex transmitter, utilized in the present invention, along with signal waveforms appearing at the various stages in the transmitter, FIGURE 2 is a circuit diagram of a multiplex modulating unit suitable for use with the transmitter of FIGURE 1, FIGURE 3 is an alternative arrangement of the circuit of FIGURE 2, FIGURE 4 is a frequency spectrum diagram of the modulated subcarrier signals utilized in this invention, FIGURE 5 is a diagram partly in block form of a receiver along with waveforms appearing at various stages in the receiver suitable for receiving a signal transmitted by the transmitter of FIGURE 1, FIGURE 6 is a diagram illustrating the distortions present in a signal received by the receiver of FIGURE 5, FIGURE 7 is a graph of distortion versus a half bandwidth deemphasis characteristic for the receiver, FIGURE 8 is a diagram in block form of the stereophonic transmitter of this invention, FIGURE 9 is a diagram illustrating the frequency distribution of the components of the composite modulation signal $E_m$, FIGURE 10 is a diagram, partly in block form, of the stereophonic receiver of this invention, FIGURE 11 is a diagram, partly in block form, illustrating an alternative form of the stereophonic receiver of this invention, and FIGURE 12 is a diagram illustrating the frequency distribution of the components of the composite signal of this invention when broadcasting the audio portion of a television signal.

In order that the stereophonic communication system of this invention may be properly understood and all of its attending advantages fully appreciated, an improved multiplex communication system utilized in the present invention will first be described. Reference is made to FIGURES 1, 2, 3, 4, 5, 6 and 7 for purposes of this description.

FIGURE 1 illustrates in block form a transmitter in accordance with this invention utilized for transmitting an intelligence signal by a multiplexing technique. An unsymmetrical intelligence signal 11 is shown derived from a signal source 12. The signal 11 has a positive alternation 13 and a negative alternation 14 about an average value of voltage represented by the straight line axis 15. Intelligence signal 11 need not be unsymmetrical about axis 15 as shown but is illustrated as such here in order to demonstrate clearly the different signal processing phases utilized by the multiplexer of the transmitter. Signal 1 may represent any intelligence to be transmitted and the signal source 12 may represent any desired signal source. In the stereophonic communication system of the present invention, the signal 11 is hereinafter shown to be an (L—R) signal. The intelligence signal 11 is coupled to a multiplex modulating unit 16, shown enclosed within dotted lines.

Modulating unit 16 is arranged for providing modulation and frequency division multiplexing without generating a residual component of subcarrier signal. The signal 11 is shown coupled to a first modulator 17 for amplitude modulating a first subcarrier signal $E_{s1}$. Subcarrier signal $E_{s1}$ is derived from a subcarrier signal source 18, which may be a conventional oscillator. The modulator 17 is arranged so as to provide an output signal of subcarrier frequency, $f_{s1}$, having an envelope corresponding to the positive alternation 13 of signal 11 but which does not contain a residual component of subcarrier signal. Waveform 19 illustrates the envelope of subcarrier $E_{s1}$ at the output of modulator 17. The signal 11 is also coupled to a second modulator 20 for amplitude modulating a second subcarrier signal $E_{s2}$. The subcarrier signal $E_{s2}$ is derived from a subcarrier signal source 21 which may be a conventional oscillator. The modulator 20 is arranged so as to provide an output signal of subcarrier frequency, $f_{s2}$, having an envelope corresponding to the negative alternation 14 of signal 11 but which does not contain a residual component of subcarrier signal. Waveform 22 illustrates the envelope of subcarrier $E_{s2}$ at the output of modulator 20.

Referring now to FIGURE 2, a circuit arranged for providing the desired modulated outputs of modulator unit 16 is shown. A first triode 30 and a second triode 31 are shown having their anode circuits connected in a push-pull arrangement. Anodes 32 and 33 are connected to opposite ends of the secondary winding 34 of a transformer 35. The secondary winding 34 has a center tap 36 connected to ground potential. Signal source 12 of FIGURE 1 is coupled to a primary winding 37 of the transformer 35 so as to develop a signal 11 across the primary winding. A resistance 38 is coupled between cathode 39 of triode 30 and ground potential. The $E_{s1}$ subcarrier source 18 of FIGURE 1 is coupled to control electrode 40 via a capacitor 41 and grid-leak resistor 42. A resistance 43 is coupled between cathode 44 of triode 31 and ground potential. The $E_{s2}$ subcarrier source 21 of FIGURE 1 is coupled to control electrode 45 via the capacitor 46 and grid-leak resistor 47.

A residual subcarrier signal will not be generated by this modulating circuit since anodes 32 and 33 are connected to ground potential for D.C. through the secondary winding 34. Plate power is supplied to the triodes only when a signal 11 appears across the primary winding 37. Thus, although subcarrier voltages may exist at control electrodes 40 and 45, plate current will not flow in the absence of plate voltage and no output subcarrier signal will be developed by either of triodes 30 or 31. The phasing of the transformer windings is such that when the positive alternation 13 of signal 11 appears across primary winding 37, anode 32 is driven positive while anode 33 is driven negative with respect to ground potential. Plate current of $f_{s1}$ frequency flows in triode 30 and a voltage of $f_{s1}$ frequency having a waveform 19 corresponding to the positive alternations 13 of signal 11 exists at cathode 39. In a similar manner, when the negative alternation 14, of signal 11, appears across primary winding 37, anode 33 is driven positive while anode 32 is driven negative with respect to ground potential. Plate curent of $f_{s2}$ frequency flows in triode 31 and a voltage of $f_{s2}$ frequency having a waveform 22 exists at cathode 44.

The resulting modulated subcarrier signals 19 and 22 may be transmitted directly to a receiving station, for example by radiation, or, as illustrated in FIGURE 1, they may be utilized to modulate a station carrier signal $E_{car}$ which in turn is transmitted. In either case, unless the subcarrier signals $E_{s1}$ and $E_{s2}$ are substantially separated in frequency, sideband overlap will be created whereby harmonic sideband components of one of the modulated subcarrier signals appear in the frequency band of the other modulated subcarrier signal. This sideband overlap may be explained in the following manner. When a Fourier series analysis is made of the aforementioned modulated subcarrier signals, the modulated signals are found to be comprised of a carrier component, sideband components corresponding to the fundamental audio frequency, and sidebands corresponding to even harmonics of the fundamental frequency. The higher sideband harmonic frequencies overlap into the natural modulation band of the other subcarrier and create spurious responses at the receiver.

Figure 4A:
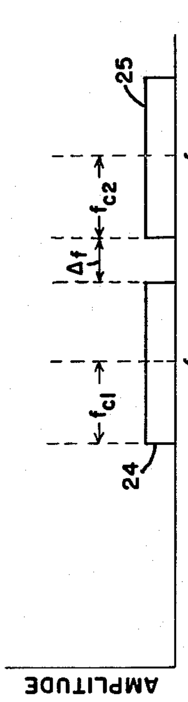
Figure 4B:
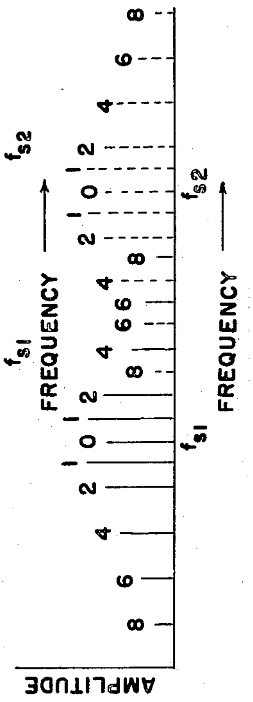

Referring now to FIGURE 4A, a pair of frequency spectrum curves 24 and 25 are shown and illustrate the relative natural frequency bands in which the modulation components of modulated signals 19 and 22 would normally lie if proper frequency separation, $\Delta f$, is provided between subcarrier signals $E_{s1}$ and $E_{s2}$. FIGURE 4B, drawn to a different frequency scale than 4A, illustrates the above described mutual overlapping of $E_{s1}$ and $E_{s2}$ harmonic components when adequate frequency separation is not provided. The subcarrier $E_{s1}$ and related harmonic modulation components are shown in FIGURE 4B by solid lines. The modulation harmonic components are indicated by superscripts. Subcarrier $E_{s2}$ and its related harmonic modulation components are shown in FIGURE 4B by dashed lines. Overlapping of the higher order harmonics of one modulated subcarrier into the natural band of the other modulated subcarrier when adequate separation $\Delta f$ is not provided is apparent from FIGURE 4B. The overlapping $E_{s1}$ harmonic components "beat" with the $E_{s2}$ subcarrier at a receiver and result in an undesirable spurious response while the overlapping $E_{s2}$ harmonic components "beat" with the $E_{s1}$ subcarrier at a receiver and result in an undesirable spurious response.

In accordance with a feature of this invention, band limiting means are provided at the transmitter for limiting the bandwidth of each of the modulated waves 19 and 22, thereby eliminating overlapping and interfering harmonic components. Referring again to FIGURE 1, the wave 19, derived from modulator 17 is shown coupled to a band limiter 26 which restricts the bandwidth of the wave 19 thereby preventing any sideband harmonic components of wave 19 from appearing in the frequency band 25 of wave 22. Similarly, wave 22 is coupled to a band limiter 27 which restricts the bandwidth of wave 22 thereby preventing any sideband harmonic components of wave 22 from appearing in the band 24 of wave 19. Band limiters 26 and 27 may be conventional filter circuits having the desired frequency attenuation characteristics. Band limiter 26 has a one half bandwidth frequency $f_{c1}$. Band limiter 27 has a one half bandwidth frequency $f_{c2}$. The band curves 24 and 25 of FIGURE 4A may be interpreted to illustrate the bandwidth characteristic of band limiters 26 and 27 where $2f_{c1}$ and $2f_{c2}$ are selected to equal the bandwidth of the filters.

Although the waveforms 19 and 22 may be transmitted independently, as for example either directly by radiation or by further modulation of corresponding carrier signals, it is also desirable at times to combine waves 19 and 22 to form a composite signal $E_m$ which modulates a single carrier, $E_{car}$. FIGURE 1 illustrates the latter configuration wherein the band limiters 26 and 27 are coupled to a conventional adder circuit 28 for forming a composite modulation wave $E_m$. The adder 28 may be a conventional resistor matrix circuit of a type well known in the art. The composite modulation wave $E_m$, illustrated by waveform 23 is coupled to a station modulator 29 wherein a station carrier $E_{car}$ derived from an oscillator unit 48 is amplitude or frequency modulated, as desired, by the composite wave $E_m$ and coupled to an antenna 49 for radiation to a receiving station.

A receiver suitable for receiving and detecting the transmitted signal 11 is shown in FIGURE 5 along with voltage waveforms existing at corresponding stages in the receiver. An antenna 51 intercepts the radiated modulated station carrier signal $E_{car}$ and couples it to a receiver unit 52 comprising conventional RF amplifier, converter, IF amplifier and FM or AM detector stages, the latter depending on the type of modulation selected for modulating $E_{car}$. The composite waveform 23 appears at the output of the detector stage of unit 52 and is coupled to a final detector circuit for deriving the signal 11 from the modulated subcarrier wave. The final detector circuit is hereinafter referred to as the subcarrier detector.

A subcarrier detector circuit is provided for each of the waveforms 19 and 22. A capacitor 53 couples the composite signal 23 to a parallel resonant circuit 54 which is tuned to the subcarrier frequency, $f_{s1}$. A capacitor 55 also couples the composite signal 23 to a parallel resonant circuit 56 which is tuned to the subcarrier frequency $f_{s2}$. A pair of rectifying diodes 57 and 58 are coupled to the resonant circuits 54 and 56, respectively, and to a common load resistor 59. The resistor 59 is a potentiometer having a sliding arm 60. Capacitors 61 and 62 are radio frequency by-pass capacitors. The diodes 57 and 58 are poled to rectify the waves 19 and 22 in a manner so as to develop a signal voltage corresponding to transmitted signal 11 at the arm 60. By reversing the polarity of diodes 57 and 58, an inverted wave 11 may be developed at arm 60. By adjustment of arm 60, proper balance between the amplitude of the positive and negative voltage alternations 13 and 14, respectively, may be obtained. A filter circuit 63 having a plurality of capacitors 64, 65 and 66 and an inductance 67 is shown enclosed by dotted lines. The filter 63, to be described hereinafter, couples the signal 11 from the potentiometer 59 to a utility circuit 68.

A change in the waveform of the modulation envelope of the modulated subcarrier signals occurs in the above described communication system when band limiting means are included at the transmitter. For a description of this change in wave shape, reference is made once again to the signal waveform 11 of FIGURE 1 where it can be seen that the positive alternation 13 consists of one-half of a sinusoidal wave. The multiplex transmission system hereinbefore described, in effect, bisects the waveform 11 and transmits the alternate positive 13 and negative 14 waveforms independently. The positive half of the sinusoidal wave 13 may be represented mathematically by an infinite number of harmonics. For reasons described hereinafter, especially covering the utilization of the present system for transmitting the audio portion of a television signal, the band limiters 26 and 27 have bandwidths which do not pass the entire natural band of frequencies contained in the modulated subcarrier signals. By passing the modulation waveform 19 through the band limiter 26 having a limited band pass characteristic, many of the higher order harmonics of the modulated signal are attenuated and the waveform of the transmitted half of the sinusoidal wave 13 therefore changes in that the waveform is attenuated and overshoot lobes are generated. The negative alternation 14 similarly changes wave shape when waveform 22 is passed through band limiter 27. The changes in envelope wave shape arise because attenuation of the higher order harmonics causes the carrier phase to reverse during part of the fundamental audio frequency. FIGURE 6 illustrates these envelope waveform changes. FIGURE 6A represents a signal to be transmitted, which, for purposes of this description is shown to be symmetrical. The solid line portion 70 illustrates the positive alternation which modulates $E_{s1}$ while the dotted line portion 71 illustrates the negative alternation which modulates $E_{s2}$. FIGURE 6B illustrates the corresponding envelopes 72 and 73 of subcarrier frequencies $f_{s1}$ and $f_{s2}$, respectively, prior to band limiting by units 26 and 27, respectively. FIGURE 6C shows the subcarrier envelopes after passage through these band limiting units. The envelopes 72 and 73 have been attenuated, and phase shifted while positive and negative overshoot lobes 74 and 75 have been generated as a portion of the waveform of envelope 72 and positive and negative overshoot lobes 76 and 77 have been generated as a portion of the waveform of envelope 73. FIGURE 6D illustrates the respective voltages after detection by the subcarrier detector of FIGURE 5 while FIGURE 6E illustrates the signal waveform existing at potentiometer arm 60 after recombination. The flat topped waves are the result of the combination of a fundamental and an alternate lobe. The signal waveform illustrated in FIGURE 6E contains about 16% third harmonic distortion. By deemphasizing this signal after subcarrier detection, by means not shown, harmonic distortion can be reduced to approximately 6%. Such a deemphasized signal is shown in FIGURE 6F.

In accordance with a feature of this invention, means are provided for simultaneously separating the subcarrier signals at the receiver and for substantially attenuating the overshoot lobes in the received subcarrier waveforms by deemphasizing the modulated subcarrier signals prior to detection by the subcarrier detector. Deemphasis can be conveniently achieved by combining the deemphasis requirement with the selective characteristics of the parallel resonant circuits 54 and 56 which are provided for subcarrier signal separation. Such an arrangement is described in my copending application Serial No. 66,277 filed October 31, 1960, and assigned to the assignee of the present invention. In this arrangement, the resonant circuits 54 and 56 must have a loaded Q defined by:

$$Q=\pi f_s \tau \qquad (1)$$

where $f_s$= the tuned subcarrier frequency of the resonant circuits and $\tau$, a deemphasis time constant, is determined from the relation $$\tau f_c \geqq 0.352 \qquad \textbf{(2)}$$

where $f_c$ is the half bandwidth frequency of the band limiters 26 and 27 at the transmitter.

FIGURE 6G illustrates the waveform existing across the resonant circuits 54 and 56 when the resonant circuits are adjusted in accordance with Equations 1 and 2 above.

The effect of deemphasis in accordance with this invention is to shift the phase of the audio signal and to attenuate the waveforms so that only very small negative phase lobes are produced. The lobes are attenuated since they are comprised of the fundamental and higher order harmonics and all of these components are attenuated by the deemphasis characteristic. Attenuation of the negative overshooting lobes is evident in FIGURE 6G. FIGURE 6H illustrates the respective waveforms after detection by the subcarrier detector and FIGURE 6I illustrates the signal waveform existing at arm 60 of potentiometer 59.

The selected value:

$$\tau f_c \geqq 0.352$$

was chosen as typical since the maximum value of the negative overshoot is very low in amplitude for all values of $f_c\tau$ in excess of 0.352. The value of $\tau f_c$ in terms of percent harmonic distortion can be predicted with fair approximation by the hyperbolic equation $$f_c\tau \cong \frac{1+0.265}{7D}$$

when $$D \leqq 5.0$$

where $\tau$ is the deemphasis time constant in seconds, and D is the peak harmonic distortion in percentage. FIGURE 7 is a graph illustrating the distortion as a function of the product $f_c\tau$. Either of the terms in the characteristic ($f_c\tau$) may be selected to suit other selected operating conditions. For example, in a transmission system, as described, in which the carrier $E_{car}$ is frequency modulated and the signal 11 has been preemphasized, concurrent deemphasis at the receiver is required. Consequently $\tau$ will have a fixed value and only $f_c$ may be varied. Conversely, operating requirements may require $f_c$ to be the determining factor in the term ($f_c\tau$).

Referring once again to the receiver circuit of FIGURE 5, a low pass filter 63 was shown coupled to the arm 60 of potentiometer 59. This filter includes shunting capacitors 64 and 66 and a series impedance comprising capacitor 65 and a parallel connected inductance 67. The filter is adjusted so as to have a bandpass equal to one half the bandpass of the bandpass units 26 and 27 at the transmitter of FIGURE 1. The addition of filter 63 to the transmission system described above results in a substantial reduction in the distortion existing in the signal of FIGURE 6I. By eliminating higher order harmonics from the signal, the low pass filter 63 reduces the harmonic distortion in the signal existing at the potentiometer arm 60 by as much as 11 db.

Although a stated purpose of this invention is to eliminate residual subcarrier signals, I have discovered that by permitting very small amounts of residual subcarrier signals to be generated, the overshoot lobes occurring in the signal reproduced at the receiver may be substantially eliminated. FIGURE 3 illustrates the circuit of FIGURE 2 arranged to provide a small amount of $E_{s1}$ and $E_{s2}$ residual subcarrier signal. Only the necessary components of FIGURE 2 are repeated in FIGURE 3 in order to illustrate the arrangement for providing a small amount of residual carrier. A source of plate potential 50 is coupled to the anodes 32 and 33 through the secondary winding 34 of transformer 35. By proper selection of residual carrier amplitude, it will be found that the overshoot lobes illustrated in FIGURE 6C can thus be eliminated. FIGURE 7 can also be read in terms of percentage of residual subcarrier required to eliminate the negative overshoot. For example, if an overshoot lobe having 1.6% overshoot is generated, 1.6% residual subcarrier is required to eliminate the generated lobe.

Heretofore therefor a multiplex communication system has been described wherein a signal to be transmitted is encoded by modulating two subcarrier signals with opposite alternations of the signal. In accordance with another aspect of this invention, a stereophonic communication system is provided in which one of two intelligence signals is encoded and transmitted by the above described multiplex communication system.

Referring now to FIGURE 8, a stereophonic transmitter is shown including the above described multiplexing system. For purposes of clarity, the numerals representing similar units of the transmitter of FIGURE 1 are repeated. A left channel signal (L) is shown derived from a microphone 80 and coupled to a preemphasis circuit 81 wherein the higher frequency components are enhanced. The preemphasized signal will have an amplitude versus frequency characteristic defined by $$(x)_p = \sqrt{1+\omega^2\tau^2}$$

where $$\omega = 2\pi f$$

$f$=the frequency of the (L) or (R) channel signal and
$\tau$=the time constant of the preemphasis circuit.

Similarly, a right channel signal (R) is shown derived from a microphone 82 and coupled to a preemphasis circuit 83. The preemphasized signals (L) and (R) are coupled to matrix circuit 84. The circuit 84 forms the sum ($L+R$) intelligence signal and difference ($L-R$) intelligence signal by well known matrixing means. Alternatively, means may be provided to preemphasize the ($L+R$) and ($L-R$) intelligence signals rather than the (L) and (R) signals independently. What is required is that the ($L+R$) and ($L-R$) signals have a preemphasized characteristic, $(x)_p$. The ($L-R$) signal is coupled to a filter 85 for restricting the bandwidth of the signal. In some cases, it may be found unnecessary to include filter 85.

A modulating unit which modulates and frequency multiplexes the signal ($L-R$), as derived from the filter 85, is provided. The modulator unit, hereinbefore described, includes modulators 17 and 20. Sources of selected subcarrier frequencies 18 and 21 are coupled to these units. The selection of subcarrier frequencies $f_{s1}$ and $f_{s2}$ will primarily be determined by the requirements of the individual communication system. For example, the selection of these frequencies for use in a stereophonic communication system suitable for transmitting the audio portion of a television signal, described hereinafter, is primarily determined by the frequency of oscillation of the horizontal oscillator at the receiver. As hereinbefore described, the positive and negative alternations of the ($L-R$) signal amplitude modulate the first and second subcarrier signals $E_{s1}$ and $E_{s2}$. Band pass filters 26 and 27 are provided for eliminating sideband overlap previously described and for maintaining the modulated subcarrier within allocated frequency channels.

The signal ($L+R$) is coupled from the matrix circuit 84 to a delay circuit 86. The delay circuit provides a delay for signal (L+R) equivalent to the delay encountered by ($L-R$) in passing through the filters 85, 26, 27 and the modulating unit. Intelligence signal ($L+R$) is coupled to adder 28 along with the frequency shifted sub-channel signals ($L-R$) from filters 26 and 27. A composite modulation signal $E_m$ is formed in the adder circuit 28 by conventional matrixing techniques. Composite signal $E_m$ is coupled to a transmitting station modulator, 29, hereinbefore described wherein a station carrier $E_{car}$ is modulated and radiated.

FIGURE 9 illustrates the frequency distribution of the main and sub-channel components of the signal $E_m$ existing at the output of adder 28. The main channel signal ($L+R$) occupies the lower portion of the spectrum. The sub-channel includes two separate bands. A first band comprises the subcarrier $E_{s1}$ and its modulation sidebands while a second band comprises the subcarrier $E_{s2}$ and its modulation sidebands. It can thus be seen that the intelligence in ($L+R$) and ($L-R$) is maintained as distinct information by the described frequency shifting.

Referring now to FIGURE 10, a receiver suitable for receiving the stereophonic signals transmitted by the transmitter of FIGURE 8 is illustrated. It can be seen that similar elements constituting the receiver of FIGURE 5 are present in the receiver of FIGURE 10 and for purposes of clarity, numerals representing the similar elements are repeated in FIGURE 10. As previously described, an antenna 51 and conventional receiving stages comprising an RF amplifier, converter, IF amplifier and detector stages are provided by a unit 52. The composite modulation signal $E_m$ appears at the output of unit 52. $E_m$ is coupled to a subcarrier detector circuit via capacitors 53 and 55. The modulated subcarrier signals appear across the resonant circuits 54 and 56. The selective characteristics of these resonant circuits provides separation of the modulated subcarrier signals from the composite signal, the necessary deemphasis to compensate for preemphasis at the transmitter, and an attenuating characteristic for substantially attenuating the overshoot lobes, previously discussed. Rectification of the subcarrier signals is provided by diodes 57 and 58 and an $(L-R)$ signal is consequently developed across load potentiometer 59.

It will be noted that a second pair of diodes 89 and 90 are provided having a load potentiometer 91 along with a pair of suitable RF by-pass capacitors 92 and 93. Diode 89 is coupled to the resonant circuit 56 but is poled in a manner opposite to that of diode 58. Diode 90 is coupled to the resonant circuit 54 but is similarly poled in a manner opposite to that of diode 57. Diodes 89 and 90 rectify the subcarrier signals and provide an $(L-R)$ signal 180 degrees out of phase with the $(L-R)$ signal which appears across potentiometer 59. This latter signal is the inverse of $(L-R)$ and matematically is represented by the term $-(L-R)$. An arm 94, of the potentiometer 91 which is provided for obtaining proper balance between the rectified signals, couples the $-(L-R)$ signal to a low pass filter, 95 shown within dotted lines, which includes a plurality of capacitors 96, 97, 98 and an inductance 99. The low pass filter 95 performs the same function as filter 63, previously described with respect to FIGURE 5.

$E_m$ is also coupled from unit 52 to a low pass filter comprising resistor 100 and capacitor 101. The filter has a pass band which passes $(L+R)$ frequency components of $E_m$. In a known manner, it simultaneously deemphasizes the signal $(L+R)$.

The detected $(L-R)$ signal and the $(L+R)$ signal are each coupled to a potentiometer 102. The voltage appearing across this potentiometer is the sum of these signals. An arm 103 on the potentiometer 102 may be adjusted to provide proper balance between these signals. When properly adjusted, the voltage existing at the arm 103 is the (L) channel signal. The (L) signal is coupled to a conventional audio amplifier 104 and a loudspeaker 105.

In a similar manner, the detected signal $-(L-R)$ and the $(L+R)$ signal are each coupled to a potentiometer 106. The voltage appearing across this potentiometer is the sum of these signals. An arm 107 on potentiometer 106 may be adjusted to provide proper balance between these signals. When properly adjusted, the voltage existing at arm 107 is the (R) channel signal. The (R) channel signal is coupled to a conventional audio amplifier 108 and a loudspeaker 109.

In a stereophonic receiver in which cost is a primary design factor, it is desirable to utilize only a single subcarrier detector circuit and to eliminate the low pass filters 63 and 95 of FIGURE 10. Concurrently, it is desirable to obtain greater isolation between the low pass filter comprising resistor 100 and capacitor 101 of FIGURE 10 and the output signals existing at potentiometer arms 60 and 94 than is made possible by the impedance of potentiometer 102 and 106 alone. An alternative form of a stereophonic receiver embodying the present invention and providing these desirable characteristics is illustrated in FIGURE 11. Similar elements constituting the receiver of FIGURE 10 are present in the receiver of FIGURE 11 and for purposes of clarity numerals representing similar elements are repeated in FIGURE 11.

Referring now to FIGURE 11, a single subcarrier detector circuit including tuned circuits 54 and 56 and diodes 57 and 58 provides an output $(L-R)$ signal in a manner previously described with relation to FIGURE 10. A low pass filter comprising resistor 100 and capacitor 101 separates the $(L+R)$ component of a modulation signal and couples it to a control electrode 111 of a triode 112.

The triode 112 has a cathode and anode circuit arranged for providing output signals $(L+R)$ and $-(L+R)$. A resistive load impedance 113 is connected between an anode electrode 114 of the triode 112 and a source of B+ potential. A cathode circuit including resistors 115 and 116 is connected between a cathode electrode 117 of the triode 112 and ground potential. A resistor 118 couples a bias potential to the control electrode 111 from the junction of resistors 115 and 116. The triode 112 operates as a cathode-anode follower in that an in-phase component, of the signal coupled to the control electrode 111, $(L+R)$, appears at cathode 117 while a component $-(L+R)$ 180 degrees out of phase with the input signal, appears at the anode 114.

The $(L+R)$ and $-(L+R)$ signals are combinted with the $(L-R)$ signal derived from the aforementioned subcarrier detector to provide $-$(R) and (L) channel signals. The cathode 117 is coupled by a capacitor 119 to one end of a potentiometer 120. An $(L-R)$ signal derived from the subcarrier detector is coupled via arm 60 to the other end of potentiometer 120. The channel signal (L) appears across the potentiometer 120. An arm 121 couples the (L) signal, via an audio amplifier 104, to a loudspeaker 105. The $-(L+R)$ signal is coupled from the anode 114 to a potentiometer 123 via a capacitor 122. The $(L-R)$ signal derived at the subcarrier detector is connected to the other end of potentiometer 123. The channel signal $-$(R) appears across the potentiometer 123. An arm 124 couples the $-$(R) signal, via an audio amplifier 108, to the speaker 109. By proper phasing of the output connection from the amplifier 108 to the speaker 109, a phase reversal may be achieved and an (R) signal is coupled to the speaker 109. Thus, I have described a stereophonic transmission system utilizing multiplexing techniques for encoding the $(L-R)$ subchannel signal.

It has previously been stated that the selection of the subcarrier frequencies was primarily determined by the type of communication system being employed. In accordance with another feature of this invention, I have selected the subcarrier frequencies hereinbefore described and the filter units 85, 26 and 27 of the transmitter of FIGURE 8 and the low pass filters of the receiver of FIGURE 10 in a manner so as to make the described multiplexing system compatible with presently adopted television broadcasting standards. Present television broadcasting standards require a horizontal sweep rate of 15.75 kc. at the television receiver. The fundamental component $H_{o1}$, and harmonic components $H_{o2}$, $H_{o3}$, etc. of the horizontal sweep waveform are generally of a high enough electrical energy level in the vicinity of the receiver so as to cause interference at these frequencies. In accordance with a feature of this invention, the subcarrier frequencies $f_{s1}$ and $f_{s2}$ are selected so as to lie substantially midway in the frequency spectrum between these horizontal components.

FIGURE 12 illustrates this desirable frequency distribution. The filter 85 at the transmitter of FIGURE 8 is selected to have a bandpass of 6.4 kc. The sidebands generated by subcarrier modulation will then have a 12.8 kc. bandwidth. Filters 26 and 27 are selected to have a pass band of 12.8 kc. about their respective subcarrier center frequencies. Thus, the modulation sidebands of the subcarrier signals are inserted between the interfering components of the horizontal sweep system. The aforementioned low pass filters of the receiver of FIGURE 10 are selected to have a bandwidth of approximately 6.4 kc. These filters perform the dual function of reducing the harmonic distortion previously discussed and of eliminating any horizontal oscillator frequency components which might possibly appear in the detected signals.

I have described a stereophonic transmission system utilizing multiplexing techniques for encoding one of the intelligence signals being transmitted. Various modifications to this system will be apparent to those skilled in the art. For example, the positive alternations of the signal being transmitted have been described as modulating the lower frequency subcarrier but it is obvious that it might equally modulate the upper subcarrier frequency while the negative alternations modulate the lower subcarrier frequency. Hence, while I have illustrated and described and pointed out in the annexed claims certain novel features of my invention, it will be understood that various omissions, substitutions and changes in the forms and details of the system illustrated may be made by those skilled in the art without departing from the spirit of the invention and scope of the claims.

What I claim as new and desire to secure by Letters Patent of the United States is:

1. A communication system comprising: transmitting and receiving stations, said transmitting station including a source of an intelligence signal which is to be transmitted, said intelligence signal having an average value of voltage with positive and negative alternations about said average value of voltage, means providing first and second subcarrier signals, means for amplitude modulating said first and second subcarrier signals with said positive and negative alternations respectively in a manner for providing first and second output subcarrier signals upon occurrence of said intelligence signal, means for limiting the bandwidth of said first and second modulated subcarrier signals, said band limiting means producing overshoot lobes in said modulated subcarrier signals, means for transmitting said modulated subcarrier signals to said receiving station and means included in said receiving station for attenuating said overshoot lobes in said modulated subcarrier signals.

2. A communication system comprising: transmitting and receiving stations, said transmitting station including a source of an intelligence signal which is to be transmitted, said intelligence signal having an average value of voltage with positive and negative alternations about said average value of voltage, means providing first and second subcarrier signals, means for amplitude modulating said first and second subcarrier signals, means coupling said source of intelligence signal to said modulating means, means coupling said subcarrier signals to said subcarrier modulating means, said modulating means arranged for providing first and second output subcarrier signals upon the occurrence of said intelligence signal, said first and second modulated output subcarrier signals having envelopes corresponding to said positive and negative alternations respectively, first and second electrical filter networks each having input and output terminals, means coupling said first modulated subcarrier signal to said input terminal of said first filter network, means coupling said second modulated subcarrier signal to said input terminal of said second filter network, said filter networks producing overshoot lobes in said modulated subcarrier signals, means for transmitting said modulated subcarrier signals to said receiving station, means coupling said output terminals of said first and second filter networks to said transmitting means, said receiving station including a subcarrier detection means, and means for attenuating prior to subcarrier detection of the modulated subcarrier signals said overshoot lobes in said modulated subcarrier signals.

3. The apparatus of claim 2 wherein said first and second filter means have half bandwidths $f_{c1}$ and $f_{c2}$ in cycles per second respectively and said means for attenuating said overshoot lobes includes first and second frequency selective means having frequency selective characteristics which are defined by the relation:

$$x=\frac{1}{\sqrt{1+\omega^2\tau^2}}$$

wherein $\omega=2\pi f$ $f$=the frequency of said intelligence signal being transmitted in cycles per second, and $$\tau\geq\frac{0.352}{f_c}$$

wherein $f_c$=said half bandwidth $f_{c1}$ for said first frequency selective means and $f_c$=said half bandwidth $f_{c2}$ for said second frequency selective means.

4. A transmitter comprising: a source of an intelligence signal which is to be transmitted, said intelligence signal having an average value of voltage with positive and negative alternations about said average value of voltage, means providing first and second subcarrier signals, means for amplitude modulating said first and second subcarrier signals with said positive and negative alternations respectively, said modulation means arranged for providing output signals of subcarrier frequency upon occurrence of said intelligence signal, and means for attenuating harmonic sideband overlap generated by said modulation means.

5. A stereophonic communication system comprising: a transmitting and a receiving station, said transmitting station including means providing (L) and (R) signal components of the intelligence to be transmitted, means combining said (L) and (R) signals to provide $(L+R)$ and $(L-R)$ composite signals, said $(L-R)$ signal having an average value of voltage with positive and negative alternations about said average value of voltage, means providing first and second subcarrier signals of different frequencies, means for amplitude modulating said first and second subcarrier signals with said positive and negative alternations respectively of said $(L-R)$ signal, said modulating means arranged for providing a subcarrier output signal upon occurrence of an $(L-R)$ signal, means for forming a composite modulation signal from said first and second modulated subcarrier signals and said $(L+R)$ signal, means for transmitting said composite modulation signal to said receiving station, said receiving station including means for separating said first and second modulated subcarrier signals from said composite modulation signal, means for detecting said positive and negative alternations of said $(L-R)$ signal and for reconstructing said $(L-R)$ signal from said detected alternations.

6. A stereophonic communication system comprising a transmitting and a receiving station, said transmitting station including; means providing (L) and (R) signal components of the intelligence to be transmitted, means combining said (L) and (R) signals to provide (L+R) and (L—R) composite signals, said (L—R) signal having an average value of voltage with positive and negative alternations about said average value of voltage, means providing first and second subcarrier signals of different frequencies, means for amplitude modulating said first and second subcarrier signals with said positive and negative alternations respectively of said (L—R) signal, said modulating means arranged for providing a subcarrier output signal upon occurrence of said (L—R) signal only, means for limiting the bandwidth of said first and second modulated subcarrier signals, said band limiting means generating overshoot lobes in said modulated subcarrier signals, means for forming a composite signal from said first and second modulated subcarrier signals and said (L+R) signal, means for transmitting said composite modulation signal to said receiving station, said receiving station including; means for receiving and detecting said composite modulation signal, means for separating said first and second modulated subcarrier signals from said composite modulation signal, subcarrier detection means for deriving from said modulated subcarrier signals said positive and negative alternations of said (L—R) signal, means for attenuating said overshoot lobes prior to subcarrier detection and means for reconstructing said (L—R) signal from said detected attenuation.

7. A transmitter for broadcasting stereophonically related signals composing: a source of (L+R) and (L—R) intelligence signals, said (L—R) signal having an average value of voltage with positive and negative alternations thereabout, means providing first and second subcarrier signals, means for amplitude modulating said first and second subcarrier signals with said positive and negative alternations of said (L—R) signal respectively, said modulation means arranged in a manner so as to provide first and second output subcarrier signals only upon the occurrence of said (L—R) intelligence signal, means for combining said (L+R) signal and said modulated subcarrier signals to form a composite modulation signal, and means for transmitting said composite modulation signal to a receiving station.

8. A communication receiver for receiving stereophonic signals of a type in which one of two intelligence signals being transmitted and having an average value of voltage is encoded by amplitude modulating first and second subcarrier signals with respective positive and negative alternations of said intelligence signal about the average value of voltage of the intelligence signal, said modulated subcarrier signals having overshoot lobes, said receiver comprising; means for simultaneously attenuating said overshoot lobes in said modulated subcarrier signals and for separating said first and second modulated subcarrier signals, means for detecting the positive and negative alternations of the intelligence signal, and means for recombining said detected positive and negative alternations to form said intelligence signal.

9. A communication receiver from receiving stereophonic signals of a type in which one of two intelligence signals being transmitted and having an average value of voltage is encoded by amplitude modulating first and second subcarrier signals with respective positive and negative alternations about the average value of voltage of the intelligence signal, said modulated subcarrier signals having overshoot lobes, said receiver comprising; first and second resonant circuits for separating said subcarrier signals and for attenuating said overshoot lobes, said first resonant circuit tuned to the frequency of said first subcarrier signal, said second resonant circuit tuned to the frequency of said second subcarrier signal, a first subcarrier detector circuit for detecting said positive alternations of said intelligence signal, means coupling said first resonant circuit to said first detector circuit, a second subcarrier detector circuit for detecting said negative alternations of said intelligence signal, means coupling said second resonant circuit to said second detector circuit, and means for combining said detected positive and negative alternations to form said intelligence signal.

10. A communication receiver for receiving stereophonic signals of a type in which one of two intelligence signals being transmitted and having an average value of voltage is encoded by amplitude modulating first and second subcarrier signals with respective positive and negative alternations about the average value of voltage of the intelligence signal and in which said modulated subcarrier signals are each passed through a band limiting filter having a half bandwidth $f_c$ prior to transmission, said receiver comprising; first and second resonant circuits, said first resonant circuit having a Q defined by:

$$Q_1 = \pi f_{s1} \tau$$

where $f_{s1}$=said first subcarrier frequency said second resonant circuit having a Q defined by:

$$Q_2 = \pi f_{s2} \tau$$

where $f_{s2}$=said second subcarrier frequency and $$\tau \geqq 0.352/f_c$$

a first subcarrier deterior circuit for detecting said positive alternations of said intelligence signal, means coupling said first resonant circuit to said first detector circuit, a second subcarrier detector circuit for detecting said negative alernations of said intelligence signal, means coupling said second resonant circuit to said second detector circuit, and means for combining the output signals of said first and second detector circuits to form said intelligence signal.

11. A communication receiver for receiving stereophonic signals of a type in which an (L+R) intelligence signal and an encoded (L—R) intelligence signal are combined to form a composite modulation signal, said (L—R) signal having an average value of voltage and being encoded by amplitude modulating a first and a second subcarrier signal of differing frequencies with respective positive and negative alternations about the average value of voltage of the intelligence signal, said receiver comprising; means for receiving and detecting said composite modulation signal, means for separating the first and second modulated subcarrier signals from said composite modulation signal, means for detecting the positive and negative alternations of the intelligence signal and means for recombining said detected positive and negative alternations to form said (L—R) intelligence signal.

12. A communication receiver for receiving stereophonic signals of a type in which an (L—R) intelligence signal being transmitted and having an average value of voltage is encoded by amplitude modulating first and second subcarrier signals with respective positive and negative alternations about the average value of voltage of the intelligence signal and said encoded (L—R) signal is then combined with an (L+R) intelligence signal to form a composite modulation signal, said receiver comprising; means for receiving and detecting said composite modulation signal, first and second resonant circuits, said first resonant circuit tuned to the frequency of said first subcarrier signal, said second resonant circuit tuned to the frequency of said second subcarrier signal, means coupling said detected composite modulation signal to said first and second resonant circuits, a first subcarrier detector circuit for detecting said positive alternations of said intelligence signal, means coupling said first resonant circuit to said first detector circuit, a second subcarrier detector circuit for detecting said negative alternations of said intelligence signal, means coupling said second resonant circuit to said second detector circuit, and means for combining said detected positive and negative alternations to form said (L—R) intelligence signal.

13. A communication receiver for receiving stereophonic signals of a type in which an (L—R) intelligence signal being transmitted and having an average value of voltage is encoded by amplitude modulating first and second subcarrier signals with respective positive and negative alternations about the average value of voltage of said intelligence signal and said encoded (L—R) signal is then combined with an (L+R) intelligence signal to form a composite modulation signal, said receiver comprising; means for receiving and detecting said composite modulation signal, a first parallel resonant circuit tuned to said first subcarrier frequency, a second parallel resonant circuit tuned to said second subcarrier frequency, means coupling said composite modulation signal to said first and second resonant circuits, a first rectifying device having anode and cathode electrodes, a second rectifying device having anode and cathode electrodes, means coupling said first resonant circuit to said anode electrode of said first rectifying device, means coupling said second resonant circuit to said cathode electrode of said second rectifying device, and a common load impedance coupled between said cathode of said first rectifying device and said anode of said second rectifying device.

14. A system for transmitting and receiving the stereophonic sound portion of a television signal comprising a transmitter and a television receiver, said transmitter including; means providing (L) and (R) signal components of the sound information to be transmitted, means for combining said (L) and (R) signal to provide (L+R) and (L—R) composite signals, means providing a preemphasis characteristic $(x)_p$ for said (L+R) and (L—R) composite signals, said (L—R) composite signal having an average value of voltage with positive and negative alternations about said average value of voltage, means providing first and second subcarrier signals having different frequencies, a modulator for modulating said first subcarrier signal with said positive alternations of said (L—R) signal and for modulating said second subcarrier signal with said negative alternations of said (L—R) signal, said modulator arranged for providing subcarrier output signals and resulting modulation sidebands upon occurrence of an (L—R) signal, means for limiting the bandwidth of each of said modulated subcarrier signals to a frequency band less than the frequency of oscillation of the horizontal oscillator in the television receiver, said band limiting means generating overshoot lobes in said first and second subcarrier signals, means providing a station carrier signal, means for modulating said station carrier signal with said first and second modulated subcarrier signals and said (L+R) signal, means for transmitting said modulated station carrier signal to said receiving station, said receiving station including; means for receiving and detecting said modulated subcarrier signals, frequency responsive means for separating said first and second modulated subcarrier signals and for deemphasizing and attenuating said overshoot lobes in said subcarrier signals prior to detection of said signals, detection means for producing from said separated first and second modulated subcarrier signals output signals corresponding to the positive and negative alternations of said (L—R) signal, and means for reconstructing said (L—R) signal from said detected alternations.

15. The apparatus of cailm 14 wherein said first and second subcarrier signal frequencies satisfy the relation $$f=nf_{ho}+f_{ho}/2$$

where $f$=the subcarrier frequency
$f_{ho}$=the horizontal oscillator frequency
and $n$=an interger representing a harmonic order of $f_{ho}$ and wherein $n$ differs for said first and second subcarrier signals.

16. The apparatus of claim 15 wherein said (L+R) intelligence signal and said added first and second subcarrier signals are combined to form a composite modulation signal prior to modulation of said station carrier signal.

References Cited by the Examiner

UNITED STATES PATENTS

| | | | |
|---|---|---|---|
| 2,080,281 | 5/1937 | Koch | 325—59 |
| 2,287,173 | 6/1942 | Hartz | 325—59 |
| 2,986,597 | 5/1961 | Teer | 179—15.55 |
| 3,099,707 | 7/1963 | Dome | 179—15 |

DAVID G. REDINBAUGH, *Primary Examiner.*